United States Patent [19]

Hofmann et al.

[11] Patent Number: 4,997,631
[45] Date of Patent: Mar. 5, 1991

[54] PROCESS FOR REDUCING NITROGEN OXIDES WITHOUT GENERATING NITROUS OXIDE

[75] Inventors: John E. Hofmann, Stamford; Barry N. Sprague, Bethlehem; William H. Sun, Wallingford, all of Conn.

[73] Assignee: Fuel Tech, Inc., Stamford, Conn.

[21] Appl. No.: 489,919

[22] Filed: Mar. 7, 1990

[51] Int. Cl.$^5$ .............................................. C01B 21/00
[52] U.S. Cl. ................................................. 423/235
[58] Field of Search ........................................ 423/235

[56] References Cited

U.S. PATENT DOCUMENTS

| | | | |
|---|---|---|---|
| 3,635,657 | 1/1972 | Bressan et al. | 423/235 |
| 3,900,554 | 8/1975 | Lyon. | |
| 4,719,092 | 1/1988 | Bowers | 423/235 |
| 4,756,890 | 7/1988 | Tang et al. | 423/235 |
| 4,777,024 | 10/1988 | Epperly et al. . | |
| 4,780,289 | 10/1988 | Epperly et al. . | |
| 4,803,059 | 2/1989 | Sullivan et al. | 423/235 |
| 4,830,839 | 5/1989 | Epperly et al. | 423/235 |
| 4,863,704 | 9/1989 | Epperly et al. . | |
| 4,877,590 | 10/1989 | Epperly et al. . | |
| 4,902,488 | 2/1990 | Epperly et al. . | |

FOREIGN PATENT DOCUMENTS

WO89/02780 4/1989 PCT Int'l Appl. .
WO89/02781 4/1989 PCT Int'l Appl. .

Primary Examiner—Wayne A. Langel
Attorney, Agent, or Firm—St. Onge Steward Johnston & Reens

[57] ABSTRACT

A process is presented for the reduction of nitrogen oxides in the effluent from the combustion of a carbonaceous fuel while reducing the generation of nitrous oxide. The process comprises introducing a treatment agent comprising ammonium carbamate into the effluent in an amount effective to substantially avoid the presence of nitrous oxide.

19 Claims, 3 Drawing Sheets

PROCESS FOR REDUCING NITROGEN OXIDES WITHOUT GENERATING NITROUS OXIDE

TECHNICAL FIELD

The present invention relates to a process for the reduction of nitrogen oxides ($NO_x$, where x is an integer) in the effluent, especially the oxygen rich effluent, from the combustion of a carbonaceous fuel while minimizing the generation of nitrous oxide ($N_2O$), as well as other pollutants, such as ammonia ($NH_3$) and/or carbon monoxide (CO).

Carbonaceous fuels can be made to burn more completely and with reduced emissions of carbon monoxide and unburned hydrocarbons when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated. Unfortunately, such high temperatures tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F., as well as gas turbines and diesel engines.

Nitrogen oxides are troublesome pollutants which are found in the combustion streams of boilers when fired as described above, and comprise a major irritant in smog. It is further believed that nitrogen oxides can undergo a process known as photo-chemical smog formation, through a series of reactions in the presence of some hydrocarbons. Moreover, nitrogen oxides comprise a significant contributor to acid rain, and have been implicated as contributing to the undesirable depletion of the ozone layer. They may also impact on the warming of the atmosphere commonly referred to as the "greenhouse effect".

Recently, many processes for the reduction of $NO_x$ in combustion effluents have been developed. They can generally be segregated into two basic categories: selective and non-selective. Among the selective processes, which are believed in the art to be the more desirable, there is a further division between selective catalytic reduction (SCR) and selective non-catalytic reduction (SNCR) processes. Although SCR processes are believed to be capable of achieving higher levels of nitrogen oxides reductions, SNCR processes are often preferred because of their greater economy and flexibility.

SNCR processes, which are temperature dependent, generally utilize a nitrogenous substance such as urea or ammonia as well as non-nitrogenous substances and proceed in the gas phase by a complex series of free radical-mediated chemical reactions involving various nitrogen, hydrogen, oxygen and carbon-containing species and radicals. Unfortunately, it has recently been found that many nitrogenous substances, when introduced into the effluent, can lead to the generation of nitrous oxide. Although there has not been a great deal of attention paid to this generation of nitrous oxide, it is also considered the emission of which into the environment is clearly undesirable.

BACKGROUND ART

Processes and compositions for the reduction of nitrogen oxides in an effluent from the combustion of a carbonaceous fuel have been developed extensively over recent years. With the increased attention to the health risks and environmental damage caused by agents such as smog and acid rain, it is expected that $NO_x$ reduction research will continue to be pursued.

In the past, most processes for the reduction of nitrogen oxides levels have concentrated on achieving maximum $NO_x$ reductions without addressing the problems raised by the production of other pollutants such as ammonia and carbon monoxide. More recently, in a unique application of $NO_x$-reducing principles, Epperly, Peter-Hoblyn, Shulof, Jr. and Sullivan, in U.S. Pat. No. 4,777,024, disclosed a method of achieving substantial nitrogen oxides reductions while minimizing the production of other pollutants through a multiple stage injection process. Moreover, Epperly, O'Leary, and Sullivan, in U.S. Pat. No. 4,780,289, have disclosed a complementary process for achieving significant, and potentially maximized, $NO_x$ reductions while minimizing the production of other pollutants by utilizing the nitrogen oxides reduction versus effluent temperature curve of the treatment regimen being effected at each $NO_x$ reduction introduction in a combustion system. These inventions, though, focused mainly on minimizing the levels of ammonia and carbon monoxide, and do not address the generation of $N_2O$.

What is desired, therefore, is a system whereby nitrogen oxides reductions can be achieved without the generation of substantial amounts of nitrous oxide. Preferably, such system also leads to the minimization of the production of other pollutants.

DISCLOSURE OF INVENTION

The present invention relates to a process for reducing nitrogen oxides in the effluent from the combustion of a carbonaceous fuel without generating a substantial amount of nitrous oxide. More particularly, the present invention relates to a process which comprises introducing into the effluent from the combustion of a carbonaceous fuel a treatment agent comprising ammonium carbamate

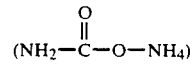

under conditions effective to reduce the nitrogen oxides concentration in the effluent while minimizing the generation of nitrous oxide.

BRIEF DESCRIPTION OF THE DRAWINGS

The objects of this invention will be described and the present invention better understood and its advantages more apparent in view of the following detailed description, especially when read with reference to the appended drawings wherein.

DEFINITIONS

Figure 1:
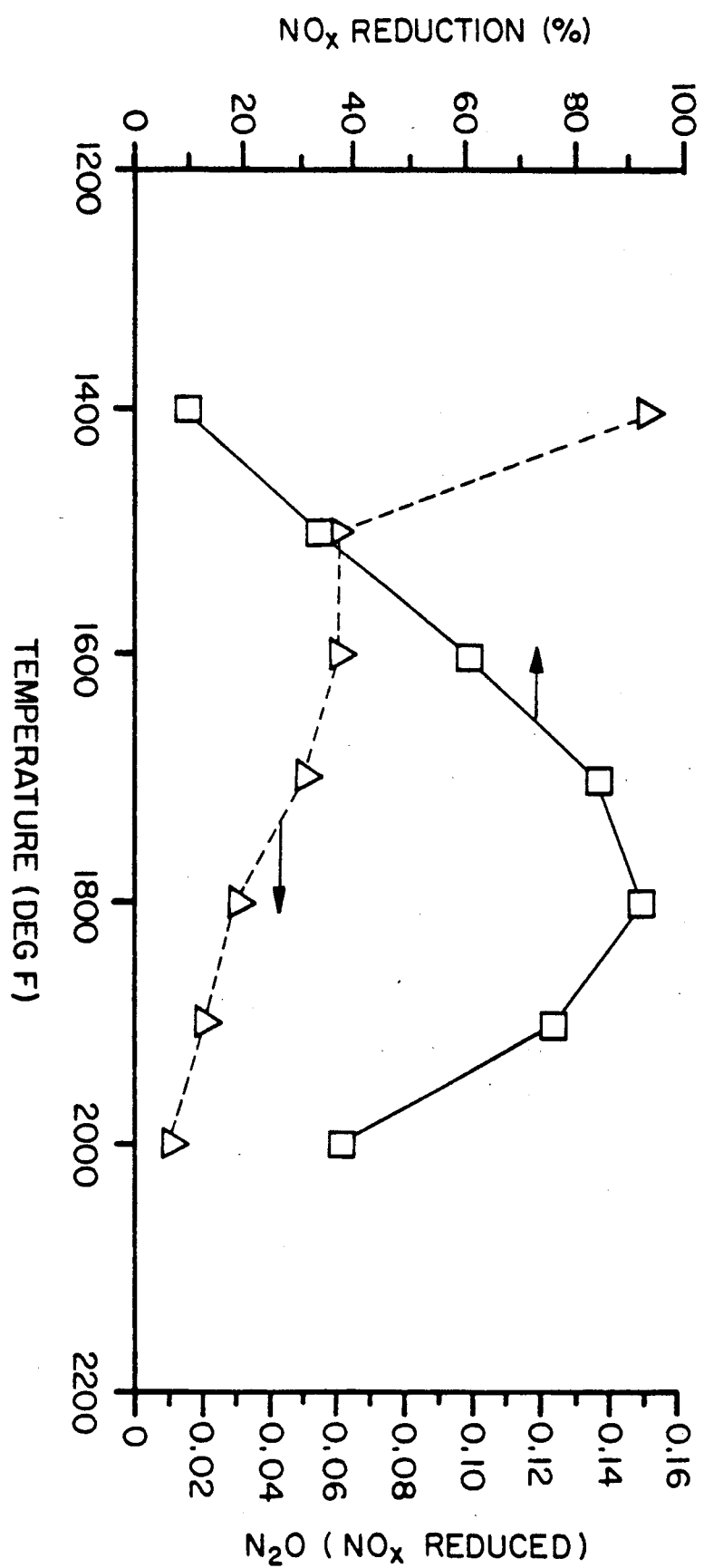
FIG. 1 is a graphic illustration of the results of Example I.

For the purposes of this description, the following definitions shall apply.

"baseline nitrogen oxides level" refers to the level of nitrogen oxides present in the effluent immediately prior to the treatment being discussed;

"curve plateau" refers to that region of a nitrogen oxides reduction versus effluent temperature curve where the $NO_x$ reduction is substantially maximized over a range of temperatures and preferably encompasses at least two data points (of course a skilled artisan will recognize that a curve plateau will not necessarily be flat due to "data scatter" and other practical data generation effects);

"enhancer weight ratio" (EWR) refers to the weight ratio of enhancer to $NO_x$ as $NO_2$ for a non-nitrogenous treatment agent;

"high temperature side" or "right side" refer to any point on the subject nitrogen oxides reduction versus effluent temperature curve which represents the reduction achieved when a treatment regimen is effected at a higher temperature than the original temperature at which the treatment regimen was effected;

"nitrogen oxides reduction versus effluent temperature curve" refers to a plot of the data points generated when a treatment regimen is effected by introducing a treatment agent into an effluent over a range of effluent temperatures and the nitrogen oxides reduction at each introduction temperature is measured (and usually expressed in terms of percent of baseline);

"normalized stoichiometric ratio" (NSR) refers to the ratio of the concentration of reducing-radicals such as $NH_x$ radicals ($NH_x$ radicals, with x being an integer, are believed to be the moiety contributed by a nitrogenous treatment agent which facilitates the series of reactions resulting in $NO_x$ breakdown) to the concentration of nitrogen oxides in the effluent and can be expressed as $[NH_x]/[NO_x]$ (alternatively, the molar ratio of the treatment agent to the $NO_x$ concentration can be used in place of NSR when the chemistry of reduction is not well defined; the term NSR as used herein will also be understood to encompass molar ratio when appropriate);

"oxygenated hydrocarbon" refers to a substituted and unsubstituted, straight or branch-chain aliphatic and cyclic, heterocyclic and aromatic hydrocarbon having at least one oxygen either in or bonded directly to the ring or a substituent group, and mixtures thereof, typical substituent groups of which include carboxylic acid groups (COOH), peroxide groups (—O—O—), carbonyl groups (C=O), hydroxyl groups (OH), ether groups (—O—), ester groups (COOR), etc.;

"pollution index" refers to an index which indicates the presence and level of all of the pollutants in the effluent;

"solution" refers to any solution, mixture or dispersion, with "solvent" referring to solvent, carrier or dispersant;

"sugar" refers to a number of useful saccharide materials which are capable of decreasing the $NO_x$ concentration in an effluent under conditions as described herein, including non-reducing and reducing water soluble monosaccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides; also included in this definition are byproducts such as molasses and corn syrup;

"treatment agent" refers to a composition comprising at least one reductant chemical (also referred to as a treatment agent component), i.e., a pollution reducing chemical capable of reducing $NO_x$, sulfur oxides ($SO_x$) or other pollutants by facilitating a reaction (the term "reaction" will be understood to refer to a single reaction or a series of reactions), and, preferably, with a solvent; and "treatment regimen" refers to the introduction (such as by injection) of a treatment agent into an effluent and the conditions under which the treatment agent is introduced, such as treatment agent components (by which is meant the ingredients of the treatment agent), treatment agent dilution (by which is meant the concentration of treatment agent components when the treatment agent used comprises a solution), relative presence of treatment agent components (by which is meant the relative weight ratio or fractions of the components which form the chemical formulation which makes up the treatment agent), treatment agent introduction rate, etc.

BEST MODE FOR CARRYING OUT THE INVENTION

As noted, the present invention relates to the introduction (which is preferably effected by injection through suitable injectors) of ammonium carbamate into an effluent under conditions effective for the reduction of nitrogen oxides while reducing or substantially avoiding the generation of nitrous oxide. Most advantageously, the claimed process also minimizes the production of other secondary pollutants such as ammonia and carbon monoxide.

Preferably, the treatment agent of this invention is injected into the effluent in solution. Aqueous solutions are preferred due to their economy and the fact that they can be employed with suitable effectiveness in most situations. The effective solutions will range from saturated to dilute. While water is an effective solvent for most applications, it will be recognized that there may be instances where other solvents may be advantageously used, either alone or in combination with water, as would be known to the skilled artisan.

The level of ammonium carbamate present in the solution is advantageously in the range of about 0.5% to about 50% by weight, preferably about 5% to about 30% by weight. The temperature of the effluent at the point of introduction will have an influence on the concentration of the solution. At temperatures of about 1300° F. to about 1700° F., the solution will tend to operate effectively at high concentration, e.g., about 10% to about 50% by weight treatment agent. On the other hand, at temperatures in excess of about 1700° F., the solution will tend more towards more dilute concentration. At these higher temperatures, water (or the solvent in case of non-aqueous solutions) may comprise greater than 80%, 85% or even 90% by weight of the solution.

The treatment agent of this invention is preferably introduced into the effluent in an amount effective to elicit a reduction in the nitrogen oxides concentration in the effluent. Advantageously, the treatment agent of this invention is introduced into the effluent in an amount sufficient to provide a molar ratio of the nitrogen contained in the treatment agent to the baseline nitrogen oxides level (by which is meant the pre-treatment level of $NO_x$ in the effluent) of about 1:5 to about 10:1. More preferably, the treatment agent is introduced into the effluent to provide a molar ratio of treatment agent nitrogen to baseline nitrogen oxides level of about 1:3 to about 5:1, most preferably about 1:2 to about 3:1.

The treatment agent is preferably injected into the effluent gas stream at a point where the effluent is at a temperature above about 1300° F., more preferably above about 1400° F. Large industrial and circulating fluidized bed boilers of the types employed for utility power plants and other large facilities will typically have access only at limited points. In the most typical situations, the boiler interior in the area above the flame operates at temperatures which at full load approach 2200° F., even 2300° F. After subsequent heat exchange, the temperature will be lower, usually in the range between about 1300° F. and 2100° F. At these temperatures, the treatment agent of this invention can be effectively introduced to accomplish substantial reduction of nitrogen oxides in the effluent.

Optionally, the ammonium carbamate can be enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, molasses, sugar, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at reducing nitrogen oxides in an effluent. These "enhancers", which are preferably present in an amount of about 0.5% to about 25% by weight when employed, function to lower the effluent temperatures at which ammonium carbamate is most effective.

Such enhancers are disclosed in, for instance, U.S. Pat. No. 4,751,065; U.S. Pat. No. 4,719,092; U.S. Pat. No. 4,888,164; U.S. Pat. No. 4,877,591; U.S. Pat. No. 4,803,059; International Patent Application entitled "Process for the Reduction of Nitrogen Oxides in an Effluent," having Publication No. WO 89/02870, filed in the names of Epperly, Sullivan and Sprague on Sept. 22, 1988; International Patent Application entitled "Process for the Reduction of Nitrogen Oxides in an Effluent," having Publication No. WO 89/03242, filed in the names of Epperly, Sullivan and Sprague on Oct. 14, 1988; U.S. Pat. No. 4,830,839; U.S. Pat. No. 4,770,863; and U.S. Pat. No. 4,902,488; U.S. Pat. No. 4,863,704, the disclosures of each of which are incorporated herein by reference.

When the treatment agent comprises ammonium carbamate without a non-nitrogenous hydrocarbon component, it is preferably introduced at an effluent temperature of about 1600° F. to about 2100° F., more preferably about 1700° F. to about 2100° F. When the treatment agent also comprises one of the enhancers discussed above, it is preferably introduced at an effluent temperature of about 1300° F. to about 1750° F., more preferably about 1400° F. to about 1750° F. or higher. These effluent temperatures at the point of introduction can be varied depending on the particular components of the treatment agent and other effluent conditions, such as the effluent oxygen level, as discussed in the referenced disclosures.

The treatment agent utilized according to this invention is preferably injected at a number of spaced positions from nozzles or other apparatus which are effective to uniformly distribute the treatment agent through the combustion effluent.

The effluent into which the treatment agent of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

In order to achieve substantial $NO_x$ reductions while also minimizing the production of other pollutants, it is desirable to utilize the nitrogen oxides reduction versus effluent temperature curve for the introduced treatment agent. The nitrogen oxides reduction versus effluent temperature curve for a treatment regimen comprises a curve plateau which indicates where the $NO_x$ reduction elicited by the treatment regimen is maximized and that such maximum level is substantially maintained over a range of effluent temperatures. Merely maximizing the nitrogen oxides reduction obtained with a treatment agent, though, is not enough, since the level of other pollutants such as nitrous oxide, ammonia and carbon monoxide are also important in reducing the overall pollution index for the effluent and not just the nitrogen oxides. As noted, nitrous oxide emissions are considered environmentally undesirable. Moreover, the levels of ammonia and carbon monoxide are important because when $NO_x$ reduction is achieved by using a nitrogenous treatment agent such as ammonium carbamate, ammonia is also often produced or remains in the effluent, whereas when $NO_x$ reduction is achieved by the use of a treatment agent which comprises a hydrocarbon enhancer in combination with ammonium carbamate, carbon monoxide is often present.

The presence of ammonia in the effluent should be minimized because, among other things, it can react with $SO_3$ to form ammonium bisulfate which can foul heat exchange surfaces in a boiler. Moreover, ammonia has detrimental effects on ambient air quality, as has carbon monoxide. If the reduction of nitrogen oxides levels brings about the production of significant amounts of other pollutants, then such reduction can, in fact, be counterproductive, since the effluent pollution index is not substantially lowered and can in certain circumstances actually be raised.

Surprisingly, as disclosed in U.S. Pat. No. 4,780,289 to Epperly, O'Leary and Sullivan, and International Patent Application entitled "Process for Nitrogen Oxides Reduction and Minimization of the Production of Other Pollutants," having Publication No. WO 89/02781, filed in the names of Epperly, Sullivan, Sprague and O'Leary on Aug. 12, 1988, the disclosures of each of which are incorporated herein by reference, operation on the high temperature or right side of the nitrogen oxides reduction versus effluent temperature curve of a treatment agent substantially reduces the production of other pollutants such as ammonia and carbon monoxide.

In fact, as disclosed, it has been found that operation on a nitrogen oxides reduction versus effluent temperature curve plateau at any point further to the right of present operation will reduce the production of other pollutants while maintaining maximum $NO_x$ reduction. If moving to the right leads to operation off the curve plateau, further reductions in secondary pollutants will be achieved, but nitrogen oxides reductions will no longer be maximized. This may be desirable depending on the level of $NO_x$ reductions required as well as maximum allowed levels of the secondary pollutants.

This "translation or shifting to the right" can be achieved by either (1) translating the position on the curve at which the treatment regimen being used is being effected by effecting that treatment regimen at a higher effluent temperature (usually by utilizing an injector upstream from the original point of injection); or (2) by varying one or more of the parameters of the treatment regimen being effected, for instance the particular components of the treatment agent, the introduction rate of the treatment agent, the dilution of the treatment agent when in solution (usually with a concommitant variation in treatment agent introduction rate to maintain the NSR or EWR of the treatment regimen) the relative presence of treatment agent components, or combinations of the above in order to replace the current treatment regimen with one which is operating further to the right on its nitrogen oxides reduction versus effluent temperature curve.

It has been found that effluent levels of nitrous oxide can also be reduced further without substantially sacrificing nitrogen oxides reductions using such "right side" technology.

It will be understood that the $NO_x$ reducing treatment agent of this invention is also useful where substantial nitrogen oxides reductions are accomplished by employing the disclosed process as a discrete step in combination with other chemical, catalytic or other procedures for reducing nitrogen oxides concentrations as well as other pollutants such as sulfur dioxide ($SO_2$), while preferably controlling levels of residual pollutants such as ammonia and/or carbon monoxide. Such a suitable "multi-step" process is disclosed in U.S. Pat. No. 4,777,024 and International Patent Application entitled "Multi-stage Process for Reducing the Concentration of Pollutants in an Effluent", International Publication No. WO 89/02780, filed in the names of Epperly, Peter-Hoblyn, Shulof, Jr., Sullivan, Sprague and O'Leary on Aug. 12, 1988, the disclosures of which are incorporated herein by reference. As taught therein, the reduction of nitrogen oxides in an effluent while maintaining low levels of secondary pollutants can be effectively accomplished by serially treating the effluent by introducing different treatment agents at different effluent temperatures. For instance, a first introduction of urea or ammonia, or like substances, can be made, at a first temperature zone such as about 1800° F. to about 2100° F., with a later, or downstream, introduction of ammonium carbamate at a second temperature zone such as about 1300° F. to about 1800° F. In this way, the two introductions can be used to achieve substantial $NO_x$ reductions, while minimizing $N_2O$ levels.

Other such "combination" processes include those disclosed by Epperly and Sprague in copending and commonly assigned U.S. patent application entitled "Hybrid Process for Nitrogen Oxides Reduction," having Ser. No. 07/395,810, filed Aug. 18, 1989; and Hofmann, Sun and Luftglass in copending and commonly assigned U.S. patent application entitled "Combined Catalytic/Non-catalytic Process for Nitrogen Oxides Reduction," having Ser. No. 07/408,122, filed Sept. 12, 1989, the disclosures of each of which are incorporated by reference herein.

The use of the present invention to achieve substantial reductions in the nitrogen oxides concentration of a combustion effluent without generating a substantial amount of $N_2O$ is illustrated by reference to the following Examples.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port to measure the concentration of compositions such as nitrogen oxides, nitrous oxide, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of injection utilizing a K-type thermocouple. Atomizing injectors described in U.S. Pat. No. 4,842,834, the disclosure of which is incorporated herein by reference, are positioned through ports in the effluent flue conduit in order to introduce and distribute the treatment agents into the effluent stream. The burner fuel is a Number 2 fuel oil, and the burner is fired at a rate of 10.2 lbs/hr. to achieve the desired temperature.

For each run, a baseline nitrogen oxides concentration reading is taken and then a 13% by weight aqueous solution of ammonium carbamate is introduced at a rate sufficient to produce the indicated NSR at the disclosed effluent temperatures. After each of the runs, a final nitrogen oxides concentration reading is taken in order to calculate the $NO_x$ reduction achieved. In addition, a nitrous oxide reading is taken, and the ratio of $N_2O/NO_x$ reduced is calculated. Furthermore, an ammonia reading is taken.

The results are set out in Table 1 and graphically illustrated in FIG. 1.

TABLE 1

| Temp. (°F.) | NSR | $NO_x$ (ppm) Baseline | $NO_x$ (ppm) Final | % $NO_x$ Reduction | $N_2O$ (ppm) | $N_2O/NO_x$ Reduced | $NH_3$ |
|---|---|---|---|---|---|---|---|
| 1400 | 2.03 | 199.4 | 180.0 | 9.7 | 3 | 0.15 | 251 |
| 1500 | 2.20 | 203.8 | 136.0 | 33.3 | 4 | 0.06 | 296 |
| 1600 | 2.05 | 193.8 | 75.5 | 61.0 | 7 | 0.06 | 58 |
| 1700 | 2.20 | 219.5 | 33.8 | 84.6 | 10 | 0.05 | 9 |
| 1800 | 2.10 | 197.0 | 14.3 | 92.7 | 6 | 0.03 | — |
| 1900 | 2.06 | 225.0 | 52.5 | 76.7 | 3 | 0.02 | — |
| 2000 | 1.98 | 229.0 | 142.5 | 37.8 | 1 | 0.01 | — |

EXAMPLE Ia

The procedure of Example I is repeated except that the treatment agent injected comprises an aqueous solution of 5.7% by weight of ammonia introduced at a rate sufficient to produce the indicated NSR.

Figure 1A:
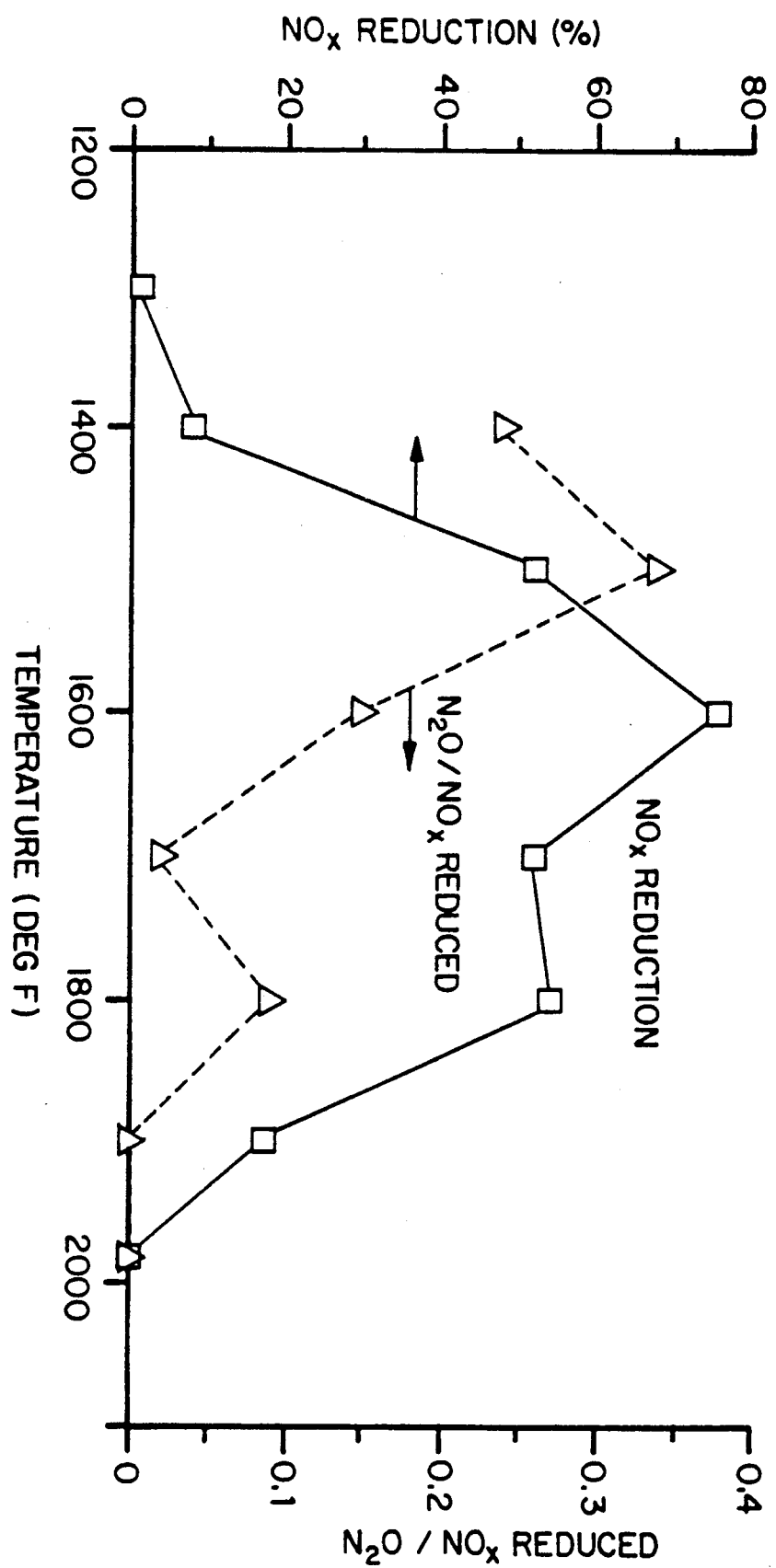
FIG. 1a is a graphic illustration of the results of Example Ia.

The results are set out in Table 1a and graphically illustrated at FIG. 1a.

TABLE 1a

| Temp. (°F.) | NSR | $NO_x$ (ppm) Baseline | $NO_x$ (ppm) Final | % $NO_x$ Reduction | $N_2O$ (ppm) | $N_2O/NO_x$ Reduced | $NH_3$ |
|---|---|---|---|---|---|---|---|
| 1300 | 2.15 | 90.0 | 89.3 | 0.8 | 2 | 2.86 | 205 |
| 1400 | 2.52 | 103.3 | 95.0 | 8.0 | 2 | 0.24 | 247 |
| 1500 | 2.46 | 79.5 | 38.0 | 52.2 | 14 | 0.34 | 33 |

TABLE 1a-continued

| Temp. (°F.) | NSR | $NO_x$ (ppm) Baseline | $NO_x$ (ppm) Final | % $NO_x$ Reduction | $N_2O$ (ppm) | $N_2O/NO_x$ Reduced | $NH_3$ |
|---|---|---|---|---|---|---|---|
| 1600 | 1.98 | 165.0 | 40.0 | 75.8 | 19 | 0.15 | 27 |
| 1700 | 1.71 | 157.3 | 74.8 | 52.1 | 2 | 0.02 | 4.4 |
| 1800 | 2.16 | 105.9 | 48.5 | 54.2 | 5 | 0.09 | 5 |
| 1900 | 1.84 | 135.0 | 111.5 | 17.4 | 0 | 0.00 | 3 |
| 1982 | 2.35 | 145.0 | 145.0 | 0.0 | 0 | 0.00 | 4 |

EXAMPLE Ib

The procedure of Example I is repeated except that the treatment agent injected comprises an aqueous solution of 5% or 10% by weight or urea introduced at a rate sufficient to produce the indicated NSR.

Figure 1B:
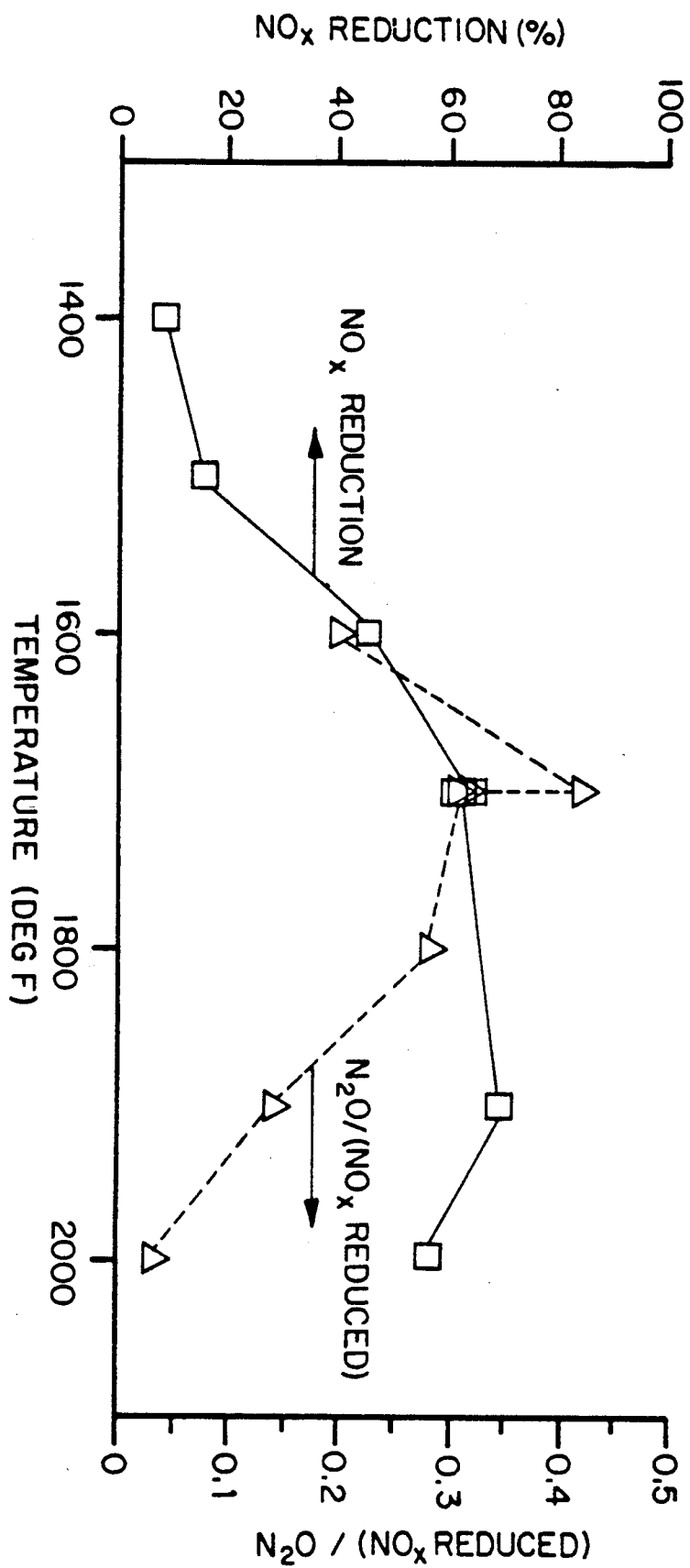
FIGURE 1b is a graphic illustration of the results of Example Ib.

The results are set out in Table 1b and graphically illustrated at FIG. 1b.

TABLE 1b

| Temp. (°F.) | NSR | $NO_x$ (ppm) Baseline | $NO_x$ (ppm) Final | % $NO_x$ Reduction | $N_2O$ (ppm) | $N_2O/NO_x$ Reduced | $NH_3$ |
|---|---|---|---|---|---|---|---|
| 1400 | 2.03 | 199.4 | 182.5 | 8.5 | — | — | — |
| 1500 | 2.23 | 224.5 | 190.0 | 15.4 | — | — | 443 |
| 1600 | 2.10 | 197.5 | 108.5 | 45.1 | 18 | 0.20 | 246 |
| 1700 | 2.23 | 199.5 | 73.3 | 63.3 | 56 | 0.44 | — |
| 1700 | 1.95 | 228.0 | 89.3 | 60.8 | 43 | 0.31 | — |
| 1700 | 2.29 | 217.0 | 80.0 | 63.1 | 43 | 0.31 | 109 |
| 1800 | 2.18 | 194.5 | 23.8 | 87.8 | 48 | 0.28 | — |
| 1900 | 2.08 | 222.5 | 69.0 | 69.0 | 22 | 0.14 | — |
| 2000 | 1.81 | 229.0 | 100.0 | 56.3 | 4 | 0.03 | 0 |

It will be apparent to the skilled artisan from the results of Examples I, Ia, and Ib that substantially less $N_2O$ is generated by the use of the process of the present invention, especially when equivalent $NO_x$ reductions are compared.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of the concentration of nitrogen oxides in the oxygen rich effluent from the combustion of a carbonaceous fuel, the process comprising introducing a treatment agent which comprises ammonium carbamate into said effluent which is at a temperature greater than about 1300° F. and in an amount effective to substantially avoid the presence of nitrous oxide.

2. The process of claim 1 wherein the temperature of the effluent is greater than about 1400° F.

3. The process of claim 1 wherein the temperature of the effluent is below about 2100° F.

4. The process of claim 1 wherein said treatment agent is injected into the effluent at a molar ratio of the nitrogen contained in said treatment agent to the baseline nitrogen oxides level of 1:5 to about 10:1.

5. The process of claim 4 wherein the molar ratio of treatment agent nitrogen to the baseline nitrogen oxides level is about 1:3 to about 5:1.

6. The process of claim 1 wherein said treatment agent further comprises an enhancer for ammonium carbamate.

7. A process for the reduction of the concentration of nitrogen oxides in the oxygen-rich effluent from the combustion of a carbonaceous fuel without the generation of a substantial amount of nitrous oxide, the process comprising:
(a) introducing a first treatment agent into the effluent at a first effluent temperature zone; and
(b) introducing a second treatment agent which comprises ammonium carbamate into the effluent at a second effluent temperature zone.

8. The process of claim 7 wherein said first treatment agent comprises urea or ammonia.

9. The process of claim 8 wherein said first temperature zone is about 1800° F. to about 2100° F.

10. The process of claim 7 wherein said second temperature zone is about 1300° F. to about 1800° F.

11. The process of claim 7 wherein said ammonium carbamate is injected into the effluent at a molar ratio of the nitrogen contained in said treatment agent to the baseline nitrogen contained in said treatment agent to the baseline nitrogen oxides level of 1:5 to about 10:1.

12. The process of claim 11 wherein the molar ratio of ammonium carbamate nitrogen to the baseline nitrogen oxides level is about 1:3 to about 5:1.

13. The process of claim 7 wherein said second treatment agent further comprises an enhancer for ammonium carbamate.

14. A process for the reduction of the concentration of nitrogen oxides in the oxygen-rich effluent from the combustion of a carbonaceous fuel, the process comprising:
a. determining the condition of the effluent which exists at a location for injection;
b. introducing a treatment agent which comprises ammonium carbamate into the effluent, which treatment agent is effective to reduce the nitrogen oxides concentration of the effluent at the determined effluent conditions through a reaction or series of reactions facilitated by said treatment agent; and
c. adjusting the components, dilution/introduction rate or relative presence of components of said treatment agent to cause the introduction of said treatment agent to operate further toward the right side of its nitrogen oxides reduction versus effluent temperature curve.

15. The process of claim 14 which further comprises increasing the introduction rate of said treatment agent to increase the normalized stoichiometric ratio until a predetermined maximum level of nitrous oxide is substantially attained but not surpassed.

16. The process of claim 14 which further comprises increasing the introduction rate of said treatment agent to increase the normalized stoichiometric ratio until a predetermined target level of nitrogen oxides reduction is substantially attained provided that a predetermined maximum level of nitrous oxide is not surpassed.

17. The process of claim 14 wherein said ammonium carbamate is injected into the effluent at a molar ratio of the nitrogen contained in said treatment agent to the baseline nitrogen contained in said treatment agent to the baseline nitrogen oxides level of 1:5 to about 10:1.

18. The process of claim 17 wherein the molar ratio of ammonium carbamate nitrogen to the baseline nitrogen oxides level is about 1:3 to about 5:1.

19. The process of claim 14 wherein said treatment agent further comprises an enhancer for ammonium carbamate.

* * * * *